US008073142B2

(12) United States Patent  
Saga et al.

(10) Patent No.: US 8,073,142 B2
(45) Date of Patent: Dec. 6, 2011

(54) INFORMATION RECORDING/REPRODUCING DEVICE AND INFORMATION RECORDING MEDIUM

(75) Inventors: Hideki Saga, Kanagawa (JP); Tatsuya Hirai, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 974 days.

(21) Appl. No.: 12/006,698

(22) Filed: Jan. 4, 2008

(65) Prior Publication Data

US 2008/0168278 A1 Jul. 10, 2008

(30) Foreign Application Priority Data

Jan. 5, 2007 (JP) ................................. 2007-000711

(51) Int. Cl.
*H04L 9/00* (2006.01)
(52) U.S. Cl. ........ 380/200; 380/201; 380/202; 380/203; 380/204
(58) Field of Classification Search .................. 380/200
See application file for complete search history.

(56) References Cited

U.S. PATENT DOCUMENTS

| | | | | |
|---|---|---|---|---|
| 6,289,102 B1 * | 9/2001 | Ueda et al. | ..................... | 380/201 |
| 6,862,582 B2 * | 3/2005 | Harada et al. | ..................... | 705/51 |
| 6,938,162 B1 * | 8/2005 | Nagai et al. | ..................... | 713/189 |
| 7,028,908 B2 | 4/2006 | Kuroda et al. | | |
| 2004/0215909 A1 | 10/2004 | Imai et al. | | |

FOREIGN PATENT DOCUMENTS

| | | |
|---|---|---|
| JP | 2004-014079 | 1/2004 |
| JP | 2004-296031 A | 10/2004 |
| JP | 2004-362278 | 12/2004 |

* cited by examiner

*Primary Examiner* — David García Cervetti
*Assistant Examiner* — Ghazal Shehni
(74) *Attorney, Agent, or Firm* — Zilka-Kotab, PC

(57) ABSTRACT

Embodiments protect user data in its entirety from unauthorized access when an authorized user does not access a medium for a predetermined length of time by making encryption key data used to encrypt the user data unavailable. In one embodiment, using a magnetic disk in which a data losing time of an encryption key data recording area is shorter than a user data recording area, recording is performed to the magnetic disk while encrypting user data during recording, and encryption key data for use with encryption is recorded in the encryption data recording area. For reproduction of the user data, the encryption key data is read from the encryption key data recording area, and the user data encrypted during the recording is output while being decrypted using an encryption key generated by the encryption key data, and the encryption key data is overwritten on the encryption key data recording area.

20 Claims, 7 Drawing Sheets

INFORMATION RECORDING/REPRODUCING DEVICE AND INFORMATION RECORDING MEDIUM

CROSS-REFERENCES TO RELATED APPLICATIONS

The instant nonprovisional patent application claims priority to Japanese Patent Application No. 2007-000711 filed Jan. 5, 2007 and which is incorporated by reference in its entirety herein for all purposes.

BACKGROUND OF THE INVENTION

Currently, in an information recording/reproducing device typified by a magnetic disk device (Hard Disk Drive: HDD), as a method of protecting user data to be stored on a recording medium, proposed and utilized is a method of Full Disk Encryption (FDE), for example. With the FDE, user data is recorded on a recording medium after encryption using an encryption key provided by an accessing person at the time of data recording or using seed data for use to generate the encryption key itself. For reading of the data, decryption is performed through supply of, to an HDD by an accessing person, an encryption key or seed data that is known only by an authorized accessing person, and the result is output as user data. In this case, if the accessing person cannot provide the encryption key or the seed data that is used for recording of the user data and is known only by an authorized accessing person, the decryption operation is erroneously made, thereby outputting data entirely different from that at the time of recording. This thus produces the consistent effects of being able to substantially disable any unauthorized access. However, such user data protection has a problem of being vulnerable in terms of security, i.e., any unauthorized accessing person becomes able to read authorized user data only by taking time by so-called Brute force attack of generating an encryption key sequentially to make access attempts in a Brute force manner.

For recording user data, there is also a method of storing an encryption key generated to be different for each HDD into any safe area in a circuit in the HDD device (generally in a nonvolatile memory not accessible from outside) or into any predetermined position on a magnetic recording medium after encryption using another private key. Only when the access is acknowledged as being made by an authorized accessing person through password authentication or others, are these encryption keys extracted, and the data read from the recording medium is decrypted for use as reproduced user data. That is, with this method, when this encryption key cannot be legally used through a user authentication process by a password or others, the user data cannot be extracted. Also when only a circuit portion of a magnetic disk device is exchanged to another of the same type cancelled with the user authentication process, because the encryption key used for encryption and decryption of user data is different for each of the HDDs so that there are consistent effects of being able to prevent access to the user data. However, as this method, when extraction of the encryption key is made through user authentication by a password or others, even if the encryption key for user data encryption is sufficiently long and Brute force attack is practically impossible for the encryption key itself, if any correct encryption key is available for use by breaking the password authentication with much expenditure of time, there is a problem in terms of security level because the user data can be read out.

That is, with an information recording device with such user data protection, the substantial user data exists practically semipermanently on a recording medium, in other words, exists until the physical chemistry life of a recording medium area storing the user data, and no measure is taken to restrict an access attempt period. There is thus a problem that any unauthorized accessing person can read the user data as long as he or she takes a long time for making access attempts.

In order to solve such problems, Japanese Patent Publication No. JP 2004-362278 ("Patent Document 1") describes a technology of performing access determination operation with a nonvolatile storage device provided with a control circuit and a nonvolatile storage circuit. That is, the nonvolatile storage circuit includes a storage area of limitation information applying access limitation with respect to use information, and the limitation information includes access period information and access time information. The control circuit determines whether the use information is allowed to be accessed or not based on the time information provided from outside and the limitation information, and based on the time information, the access time information is updated.

Japanese Patent Publication No. 2004-14079 ("Patent Document 2") describes a technology with a semiconductor recording medium provided with a battery, a clock, a data control section, an address control section, a data storage area, and a bonding pad. With a power supply from the battery, the clock, the data control section, and the address control section are operated, and a setting is made to an effective time for the data to be recorded in the data control section. A match is then always made between the lapse time counted by the clock after the data recording and the effective time thereof, and after the effective time is passed, a command coming from the data control section disables reproduction of the recorded data.

Japanese Patent Publication No. 2004-296031 ("Patent Document 3") describes a technology with a recording medium provided with an IC section at a part of a non-recording area inside of a recording area from which data reading is optically possible. This IC section is provided with an IC interface that is exposedly formed to be able to establish an electrical connection, and a time-varying section that shows a time-varying change with no power supply. This recording media reading/writing device determines whether it is in a period when this medium is available for use by measuring the state of the time-varying section.

However, the technology of Patent Document 1 requires time counting means for providing the time information from outside of the storage device for verification of access rights. At a place where no access is possible to the time counting means, using the data in the storage device is impossible in the first place, thereby resulting in a large problem in terms of usability. Moreover, even when the storage device is used at a place where the time counting means is accessible, there is a problem in terms of security that the time information provided by the time counting means is not generally guaranteed as being accurate. In order to ensure acquisition of the accurate time information from the time counting means, a person who receives benefits through access limitation is required to provide any accurate time counting means, and a user or the person who receives benefits is required to individually establish an encrypted communications path to the time counting means, thereby resulting in a large problem in terms of cost and usability.

Further, with the technology of Patent Document 2, used is a battery whose element life is generally shorter than that of a semiconductor recording medium, and thus the useful life is restricted as an entire storage medium, thereby resulting in a problem in terms of use cost and reliability as a result of limited life of the entire medium. Even if the battery is exchangeable, no technical description is given about the storage of the effective time before and after the battery exchange, thereby resulting in a problem in terms of feasibility or usability. Moreover, the battery is generally utilizing chemical reaction as its operating principles. Therefore, in the low-temperature environment where the chemical reaction is reduced in speed, the electromotive force is reduced, and contrarily in the high-temperature environment, the effective amount of electric power generation is reduced due to internal discharge. As such, there is a large problem in terms of reliability as a storage medium.

With the technology of Patent Document 3, an IC section is attached to a rotating recording medium, and if the attachment is not reliable enough, there is a possibility that the IC section may fall off during rotation. Moreover, for reading/writing of a nonvolatile memory section of the IC section, an interface section of the IC section is required to be connected with an IC connection section, thereby causing a possibility of dust generation at the time of connection. Furthermore, when an IC section is attached to a disk-shaped recording medium rotating at high speed, some displacement between the rotation center and the center of mass causes large vibrations, and there thus is a danger that the device operation suffers from trouble or the rotation mechanism is broken. As a measure thereagainst, there needs to provide a mechanism to the side of a medium driving device for compensating the rotation balance, or provide a balance weight onto a medium for compensating the mass of the IC section, and manage the attachment positions of the IC section and the balance weight with high precision. Therefore, this is considered disadvantageous because the manufacturing cost of an information recording/reproducing device and that of a recording medium are both increased.

Useful is an information recording/reproducing device having a high level of security with respect to any unauthorized access with no need to include time counting means and a power source therefor, and with no need to use any external time information provision means and any safe communications path to reach the time information provision means.

BRIEF SUMMARY OF THE INVENTION

Embodiments of the present invention protect user data in its entirety from any unauthorized access, by making encryption key data used to encrypt the user data, not available for reading when a user having an authorized access right does not access an information recording medium for a predetermined length of time. According to the particular embodiment disclosed in FIG. 3, through use of a magnetic disk 10 in which a data losing time of an encryption key data recording area 32 is shorter than a data losing time in a user data recording area 30, recording is performed to the magnetic disk 10 while encrypting user data during recording, and encryption key data for use with encryption is recorded in the encryption data recording area 32. For reproduction of the user data by a user having an authorized access right, the encryption key data is read from the encryption key data recording area 32, and the user data encrypted during the recording is output while being decrypted using an encryption key generated by the encryption key data, and the encryption key data is overwritten on the encryption key data recording area 32.

DETAILED DESCRIPTION OF THE INVENTION

Figure 1:
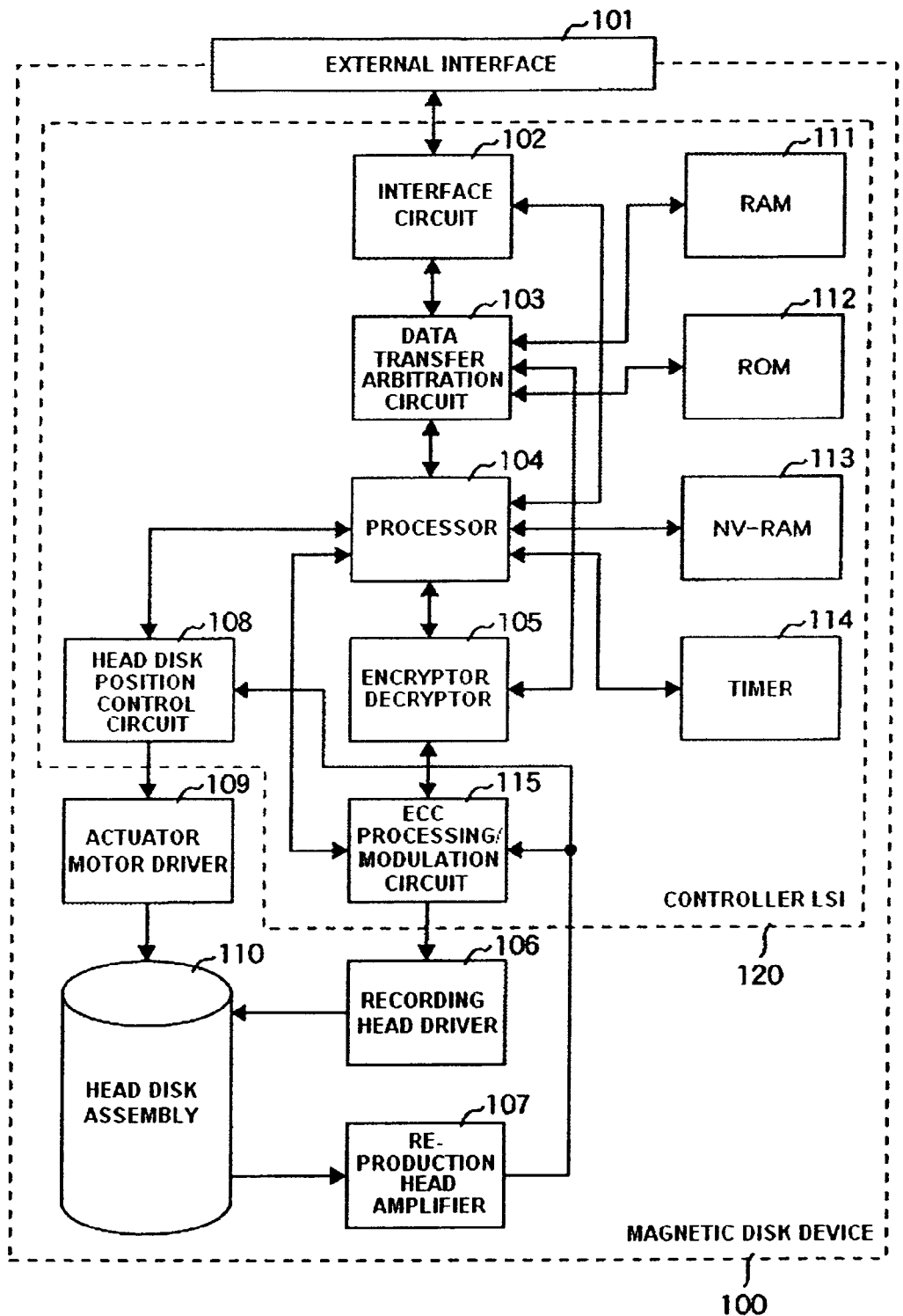
FIG. 1 is a block diagram showing the configuration of a magnetic disk device in an embodiment of the present invention.

Embodiments of the present invention relate to an information recording/reproducing device that performs recording on a recording medium while encrypting user data using an encryption key stored in the device, and decrypts, for output, the data read from the recording medium using the same encryption key.

An object of embodiments of the present invention is to protect user data in its entirety from any unauthorized access by making encryption key data used to encrypt the user data not available for reading when a user having an authorized access right does not access an information recording medium for a predetermined length of time.

Another object of embodiments of the present invention is to provide an information recording medium that makes encryption key data used to encrypt the user data not available for reading when the user data is not accessed for a predetermined length of time.

In order to achieve the objects described above, a typical information recording/reproducing device of embodiments of the present invention includes a recording medium provided with a user data recording area and an encryption key data recording area in which a time of not being able to reproduce recorded data any more in the encryption key data recording area is shorter than a time of not being able to reproduce recorded data any more in the user data recording area, at the time of recording of user data, recording is performed to the user data recording area while encrypting the user data, and encryption key data to be used for encryption is recorded in the encryption key data recording area, and at the time of reproduction of the user data by a user having an authorized access right, the encryption key data is read from the encryption key data recording area, the user data encrypted at the time of recording is output while being decrypted by an encryption key generated based on the encryption key data, and the encryption key data is overwritten on the encryption key data recording area.

Moreover, a memory is provided for storing at least two authentication data for use as authentication data for verifying the authorized access right, for verifying the access right, a matching is made between authentication data provided by the user and the authentication data stored in the memory, for the matching of the authentication data, continuous fail in matching of the authentication data is counted, and every time the frequency continuous fail in matching the authentication data reaches a predetermined value, within a range of the number of the authentication data that can be stored in the memory, the number of the authentication data to be referred to for the matching of the authentication data is increased.

In order to achieve the other object described above, a typical information recording medium of embodiments of the present invention includes: a substrate; and a recording layer that is formed at least on one surface of the substrate, and performs data recording by retaining a local physical state change, and the recording layer is provided with a user data recording area and an encryption key data recording area, and a time of not being able to reproduce recorded data any more in the encryption key data recording area is shorter than a time of not being able to reproduce recorded data any more in the user data recording area.

The recording layer comprises a magnetic recording layer, and a coercive force of the encryption key data recording area is smaller than that of the user data recording area.

According to embodiments of the present invention, when a user having an authorized access right does not access an information recording medium for a predetermined length of time, encryption key data used to encrypt user data is made not available for reading so that, as a result, the user data can be protected from any unauthorized access.

Figure 2:
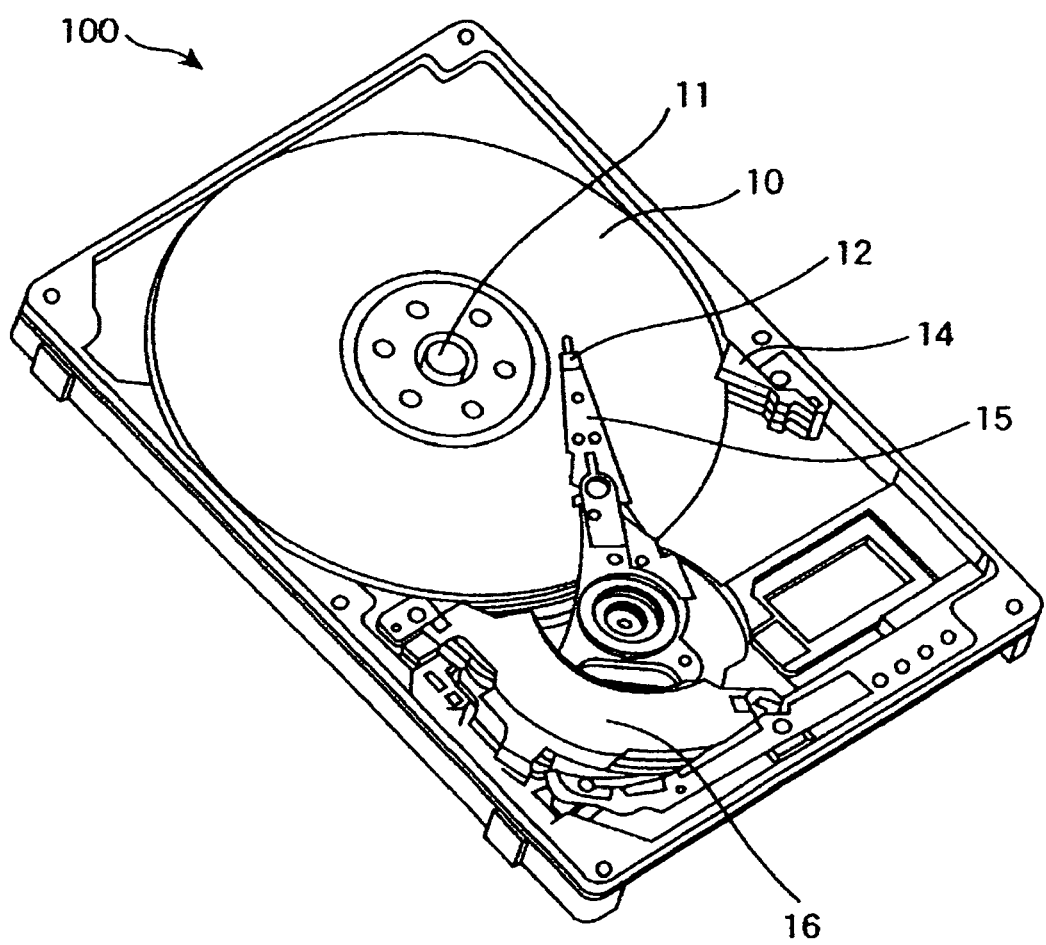
FIG. 2 is a top view showing the entire configuration of the magnetic disk device in an embodiment of the present invention.

In the following description, an embodiment of the present invention is described by referring to the accompanying drawings. FIG. 1 is a block diagram showing the configuration of a magnetic disk device. FIG. 2 is a top view showing the internal configuration of the magnetic disk device with a cover removed. In this embodiment, exemplified as an information recording/reproducing device is, as a recording medium, a magnetic disk device 100 that retains user data by a local magnetization-direction distribution on the surface of a recording medium. However, the following description is not intended to make any restriction on the recording principles of a recording medium, and is applicable, as a recording medium, also to a phase change recording medium of retaining data by any local physical state change, e.g., using crystal phase change, or a semiconductor memory element such as MRAM, FeRAM, PRAM, and Flash Memory. Moreover, it is also possible that a user data recording area that will be described later is provided on a magnetic recording medium, and an encryption key data recording area is separately provided on a recording medium with different recording principles such as MRAM, FeRAM, PRAM, and Flash Memory. In these cases, in this embodiment, any components unique to a magnetic disk device in this embodiment, e.g., a head disk position control circuit 108 and an actuator/motor driver 109, may be eliminated as appropriate or changed to any other corresponding components.

The magnetic disk device 100 is mainly configured by a controller LSI 120 that controls the operation of the magnetic disk device, a head disk assembly 110, the actuator/motor driver 109, a recording head driver 106, and a reproduction head amplifier 107. As shown in FIG. 2, the head disk assembly 110 is configured by a recording medium (magnetic disk) 10, a spindle motor 11 that rotates the magnetic disk 10, a recording/reproducing head slider 12 mounted thereon with a write element (recording head) and a read element (reproduction head), a suspension 15 that supports the recording/reproducing head slider 12, a scanning mechanism (voice coil motor) 16 that positions the recording/reproducing head slider 12 at an arbitrary radius position on the magnetic disk 10, and a ramp mechanism 14 to which the recording/reproducing head slider 12 takes shelter.

When the magnetic disk 10 is rotated by the spindle motor 11, and when the recording/reproducing head slider 12 is put in the state of floating in the vicinity of the surface of the magnetic disk, a reproduction signal output from the reproduction head is electrically amplified by the reproduction head amplifier 107, and then is input to an ECC processing/modulation circuit 115 and the head disk position control circuit 108. The head disk position control circuit 108 reads, from the amplified reproduction signal, the physical positional relationship between the recording/reproducing head slider 12 and the magnetic disk 10 and the relative speed, and based on the reading result, controls the operation of the voice coil motor 16 and that of the spindle motor 11 via the actuator/motor driver 109 to allow positioning of the recording/reproducing head slider 12 at any desired position on the magnetic disk with any desired relative speed.

For cooperative operation of the function blocks inside of the controller LSI 120, a processor 104 monitors the states of the ECC processing/modulation circuit 115, the head disk position control circuit 108, an encryptor/decryptor 105, a timer 114, an NV-RAM 113, an interface circuit 102, and a data transfer arbitration circuit 103, and always applies control thereover as appropriate. The timer 114 generates and supplies a timing signal needed by the components in the magnetic disk device 100, and always counts the time after the magnetic disk device is activated. The RAM 111 is used as a temporary storage location of user data at the time of recording and reproduction of the user data, and also as a volatilization-acceptable work area of data that indicates the operation status of the processor 104. A ROM 112 is storing, with safety and security, a program command code that is supposed to be executed by the processor 104, and as will be described later, a private key for encrypting individual data of the magnetic disk device 100, and a private key for encrypting a user authentication password. The NV-RAM 113 is storing, with safety and security, not only the user authentication password but also a flag indicating the operation lock status of the magnetic disk device that will be described later, and a current authentication level counter indicating the security level of the password.

When a recording command is provided to the interface circuit 102 via the external interface 101 from an external host device (not shown), the interface circuit 102 interprets a parameter coming together with the recording command (e.g., a sector number indicating the recording position start on the magnetic disk, and the amount of user data for recording), and notifies the result to the processor 104. Upon reception of that, the processor 104 starts the control operation over the components so as to position the recording/reproducing head slider 12 at any desired position on the magnetic disk 10. At the same time as such operation, the interface circuit 102 refers to the parameter coming together with the recording command, and issues a command for the data transfer arbitration circuit 103 to be ready to transfer user data to be recorded to any space available in the RAM 111. Thereafter, when the user data to be recorded is provided from the external host device via the external interface 101, these are temporarily stored in the RAM 111 via the interface circuit 102 and the data transfer circuit 103.

When the recording/reproducing head slider 12 reaches the position for recording on the magnetic disk, it is detected by the processor 104, and is notified to the data transfer arbitration circuit 103. In response thereto, the data transfer arbitration circuit 103 transfers the user data to be recorded in the RAM to the encryptor/decryptor 105. Using an encryption key that is separately ready, the encryptor/decryptor 105 encrypts the user data for output to the ECC processing/modulation circuit 115. In order to protect the user data from a few errors caused in the process of recording and reproduction to/from the magnetic disk 10, the ECC processing/modulation circuit 115 then applies conversion to the result with an addition of an error correction code in accordance with a predetermined modulation rule, and outputs the result to the recording head driver 106. The recording head driver 106 drives the recording head, and forms a local magnetization-direction distribution on the magnetic disk so that the recording operation is completed for the user data.

When a reproduction command is provided to the interface circuit 102 from an external host device via the external interface 101, the interface circuit 102 interprets a parameter coming together with the reproduction command (e.g., a sector number indicating the recording position start on the magnetic disk, and the amount of user data for reproduction), and notifies the result to the processor 104. Upon reception of that, the processor 104 starts the control operation so as to position the recording/reproducing head slider 12 at any desired position on the magnetic disk 10. At the same time as such operation, the interface circuit 102 refers to the parameter coming together with the reproduction command, and issues a command for the data transfer arbitration circuit 103 to be ready to transfer the reproduced user data being an output of the encryptor/decryptor 105 to any space available in the RAM 111, and to transfer the reproduced user data to be restored in the RAM 111 to the external host device via the interface circuit 102 and the external interface 101.

When the recording/reproducing head slider 12 reaches the position for recording on the magnetic disk, it is detected by the processor 104, and is notified to the ECC processing/modulation circuit 115 and the encryptor/decryptor 105. Immediately after this, a reproduction signal read by the reproduction head from the magnetic disk 10 is electrically amplified by the reproduction head amplifier 107, and then in the ECC processing/modulation circuit 115, is subjected to error correction after conversion reverse to the conversion applied at the time of recording, and the result is input to the encryptor/decryptor 105. The encryptor/decryptor 105 decrypts the user data by using a separately-provided encryption key, and the result, i.e., the reproduced user data, is temporarily stored in the RAM 111 via the data transfer arbitration circuit 103. Thereafter, in response to a command coming from the external host device, the reproduced user data is then output to the external host device via the data transfer arbitration circuit 103, the interface circuit 102, and the external interface 101, and this is the end of the reproduction operation for the user data.

An encryption key to be used for encryption and decryption of user data at the time of recording and reproduction is read from any predetermined area (encryption key data recording area) on the magnetic disk as will be described later when the magnetic disk device is activated, and then is stored in the RAM 111 after being subjected to any needed processing as required. Note that because the RAM 111 is existed on a die of the controller LSI 120, and is sealed inside of the package, a user cannot refer to or rewrite the data therein from outside. That is, the encryption key is stored with safe protection with respect to tampering.

For storage of an encryption key to any predetermined area on a magnetic disk, the following procedure is followed. That is, an encryption key to be used for encryption and decryption of user data is generated by encrypting, using a private key stored in the ROM 112, original data being a user authentication password or others that is input by a user before recording of the user data. This encryption key is encrypted again with a key of individual data (e.g., serial number) that varies among magnetic disk devices, and then is stored in any predetermined area on the magnetic disk. The individual data of the magnetic disk device 100 is stored in the ROM 112, and the user authentication password is stored in the NV-RAM 113 both with safety and security. Note that generation, into the RAM 111, of an encryption key for use with encryption/decryption of user data with the original data being a user authentication password or others is performed only during recording of the user data, and the generated encryption key is stored in the RAM 111. On the other hand, an encryption key for decryption for use during reproduction of the user data is not generated with the original data of a user authentication password or others. That is, the encryption key for decryption for use during reproduction of the user data is restored only by using, for decryption, with the individual data of the magnetic disk device 100 as a private key, the encrypted encryption key data stored in the predetermined area on the magnetic disk after any predetermined user authentication is through. The restored result is stored in the RAM 111. The timing of recording or reading of the encryption key to be used for encryption and decryption of the user data onto from the magnetic disk will be described later.

Figure 3:
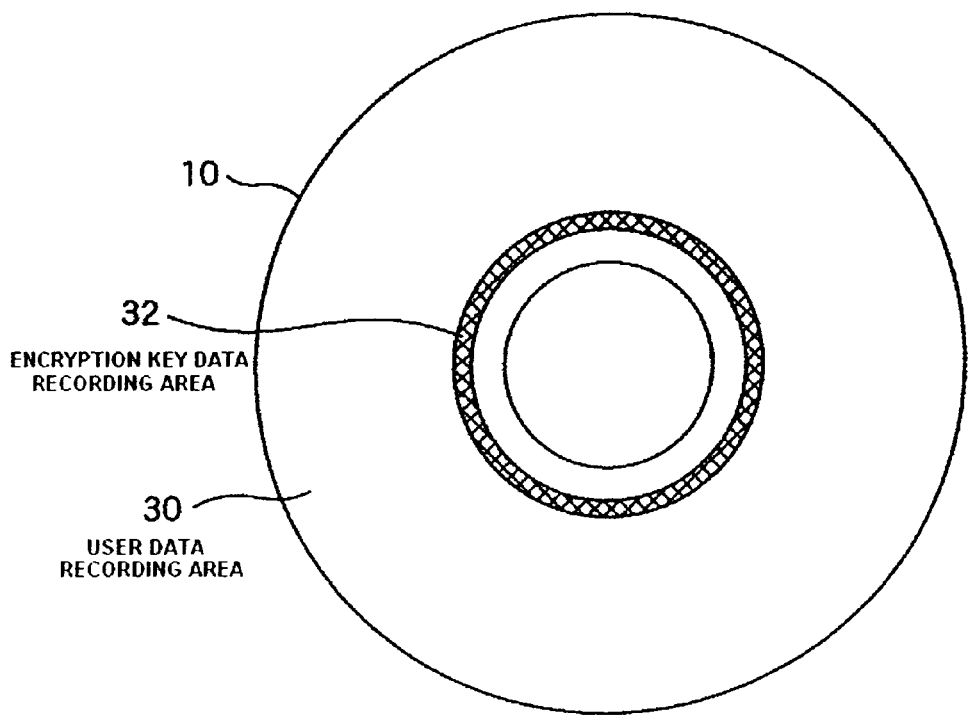
FIG. 3 is a diagram showing the configuration of a recording area of the magnetic disk in an embodiment of the present invention.

FIG. 3 is a diagram for illustrating an exemplary configuration of a magnetic disk to be used in the magnetic disk device of this embodiment. The magnetic disk 10 is a laminate with a magnetic thin film for information retention on the surface of a glass disk formed with a hole at the center portion for fixation use of a spindle motor. The recording area on the surface is mainly partitioned, by a radius, into a user data recording area 30 for recording of user data through with encryption using any predetermined encryption key data, and an encryption key data recording area 32 for recording of encryption key data encrypted using a private key separately provided with a user authentication password as original data, and a private key of individual data or others varying among magnetic disk devices. The partition between the encryption key data storage area 32 and the user data recording area 30 is made by a sputter mask at the time of deposition of a magnetic thin film by sputtering, for example. Note here that the encryption key data storage area 32 and the user data recording area 30 are not necessarily concentric circles as shown in FIG. 3, and the shape of the encryption key data storage area 32 may be the shape as a result of cutting only a portion of an angle from a circle or the shape of a sector.

Figure 4:
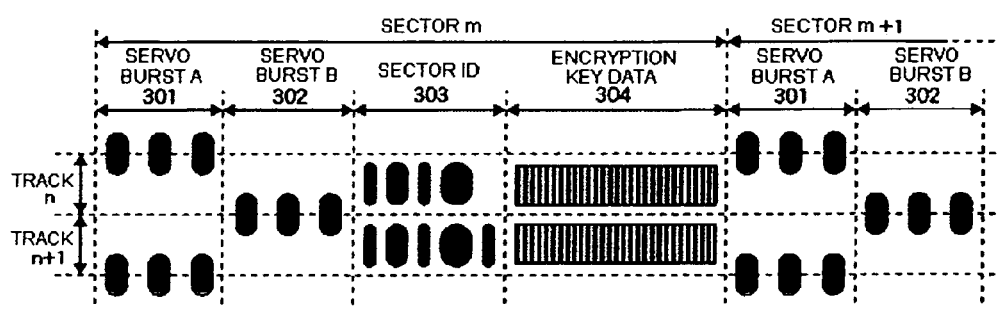
FIG. 4 is a diagram showing a format of an encryption key data recording area of the magnetic disk in an embodiment of the present invention.

FIG. 4 is a diagram showing an exemplary format of the magnetic disk 10, and is the schematic diagram in which a part of the encryption key data recording area 32 in FIG. 3 is enlarged. The encryption key data recording area 32 is configured by a plurality of tracks disposed concentrically in the radius direction, and these tracks are each segmented into a plurality of sectors in the circumferential direction. As the magnetic disk 10 rotates, the recording/reproducing head slider 12 performs scanning from left to right in FIG. 4. In the inside of the sector, a servo burst A 301 and a servo burst B 301 are disposed in a staggered manner at the regular intervals in the radius direction from the track center for use as references for positioning the recording head or the reproduction head at the track center. As a method of finding the track center from the servo bursts disposed in such a staggered manner is a widely-known method in the magnetic disk devices, and thus is not described herein. Immediately after the servo burst B 302, disposed is a sector ID 303 that is individually provided to every sector on the magnetic disk, and indicates the physical position on the magnetic disk. Immediately after the sector ID 303, encryption key data 304 is recorded. In order to ensure any desired number of sectors, the encryption key data recording area 32 is configured by the above-described format being repeatedly disposed for a predetermined number of times in the radius and circumferential directions of the recording medium. Herein, the pattern of the servo burst A 301, the pattern of the servo burst B 302, and the sector ID 303 are information that is not required to be rewritten after the magnetic disk 10 is manufactured, and are information that causes a crucial problem in view of device operation when the information is gone during the use period of the magnetic disk device body. On the other hand, the encryption key data is required to be rewritten whenever needed, and be deleted or updated through overwriting. In consideration thereof, as will be described later, in the magnetic disk device 100 in this embodiment, because the recording data losing time in the encryption key data recording area 32 is shorter than the recording data losing time in the user data recording area 30, the pattern of the servo burst A 301, the pattern of the servo burst B 302, and the pattern of the sector ID 303 are recorded with fixed information at the time of manufacturing of the magnetic disk 100 by physical uneven configuration (prepit) on the surface of the recording medium.

Figure 5:
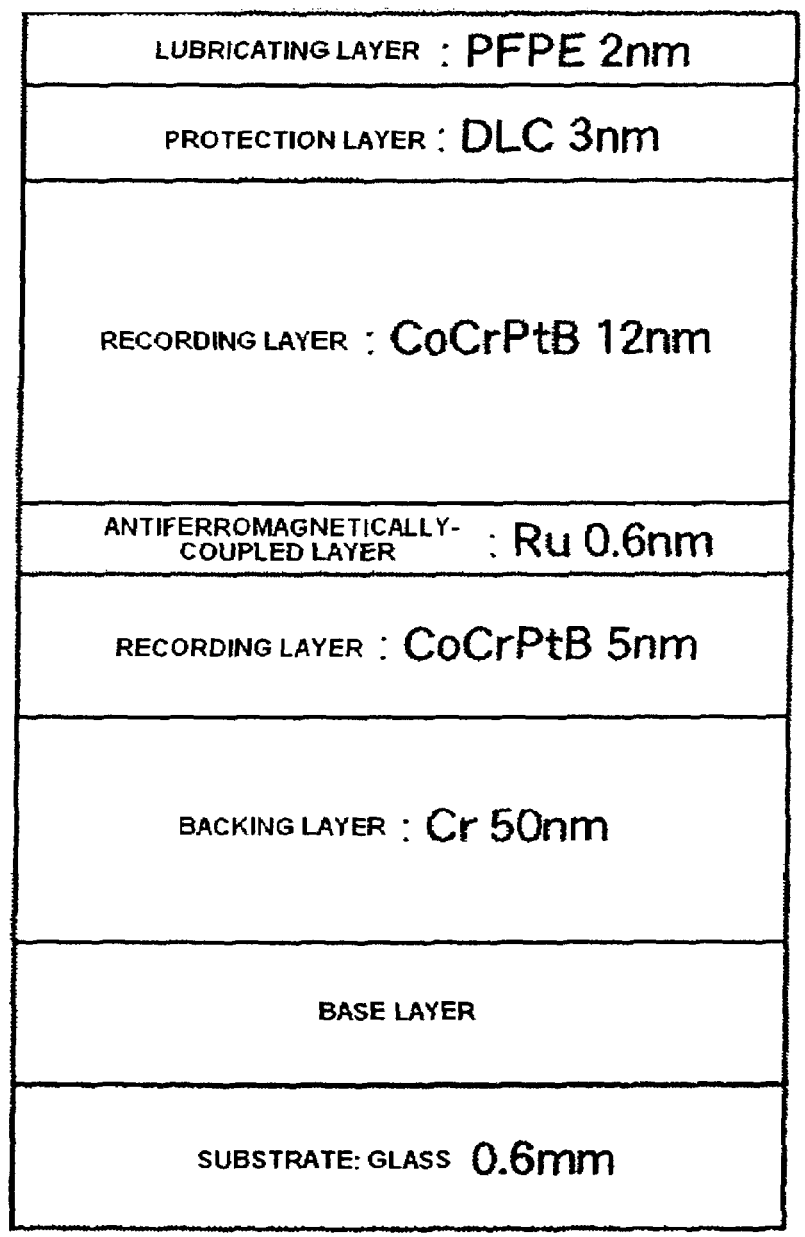
FIG. 5 is a diagram showing the laminate configuration in a user data recording area of the magnetic disk in an embodiment of the present invention.
Figure 6:
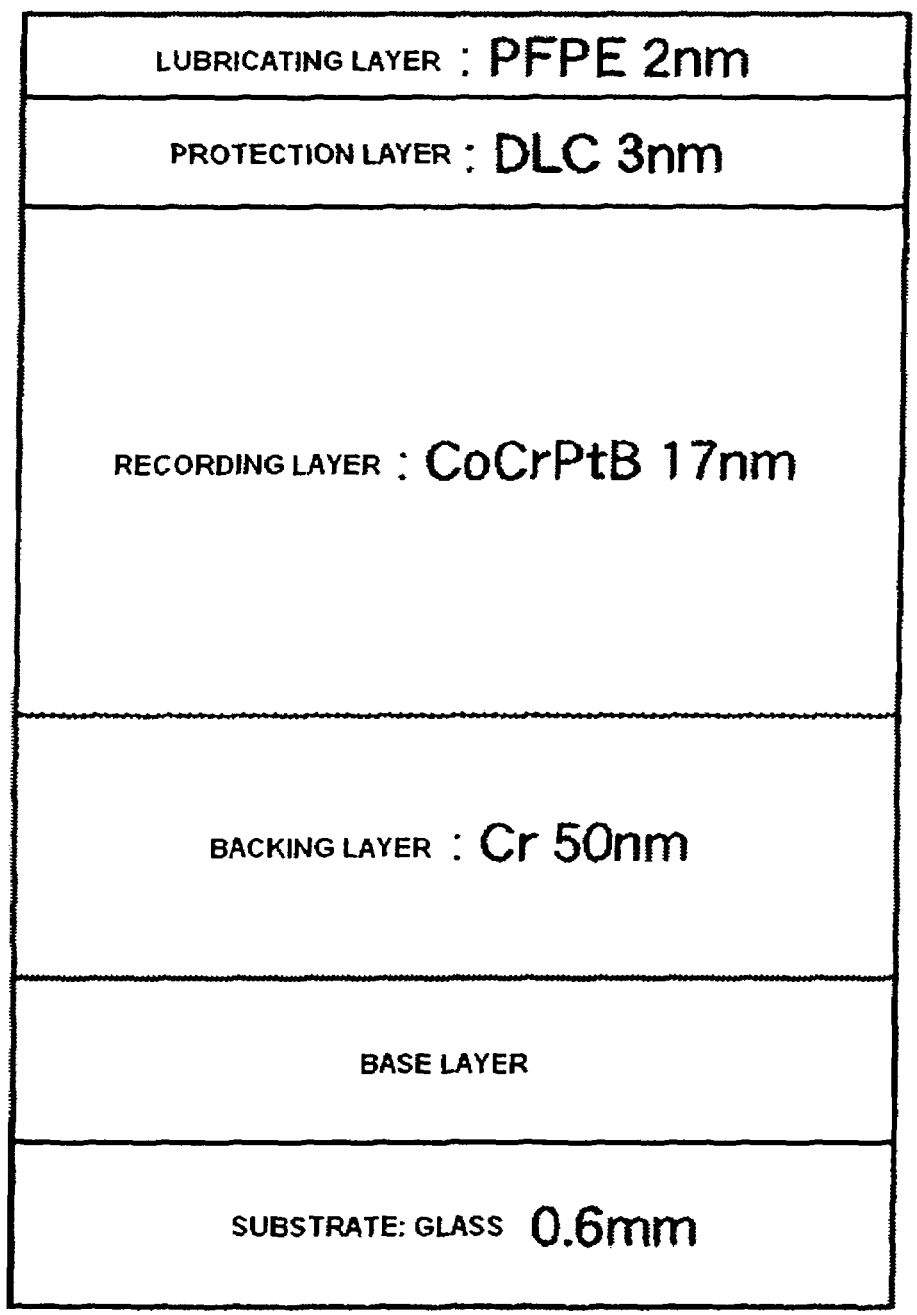
FIG. 6 is a diagram showing the laminate configuration in an encryption key data recording area of the magnetic disk in an embodiment of the present invention.

FIG. 5 is a diagram for illustrating an exemplary laminate configuration in the user data recording area 30 of the magnetic disk 10 in this embodiment, and FIG. 6 is a diagram for illustrating an exemplary laminate configuration in the encryption key data recording area 32. For manufacturing the magnetic disk 10, first of all, the surface of a glass substrate with the thickness of 0.6 mm is polished, and then is laminated with a base layer and a backing layer made of Cr with the thickness of 50 nm in this order. Thereafter, as a part of a recording layer for retaining information in the magnetization direction, a lower recording layer made of CoCrPtB with the thickness of 5 nm is laminated. A measure is then taken not to cause sedimentation to the encryption key data recording area 22 using a sputter mask, the user data recording area 20 is laminated with an antiferromagnetically-coupled layer made of Ru with the thickness of 0.6 nm. Moreover, as the remaining of the recording layer for retaining information, laminated is an upper recording layer made of CoCrPtB with the thickness of 12 nm. Lastly, for the aim of stabilizing the floating of the recording/reproducing head slider 12, after a protection layer made of DLC with the thickness of 3 nm is subjected to sputtering, a lubricating layer made of Per-Fluoro Poly-Ether (PFPE) is coated by 2 nm.

At this time, in the user data recording area 30 of FIG. 5, the upper and lower CoCrPtB recording layers are antiferromagnetically coupled to each other via the Ru layer, and are each of configuration being magnetically stable as is hardly stored with a magnetic energy outside of the recording layer. On the other hand, in the encryption key recording area 22 of FIG. 6, the upper and lower CoCrPtB recording layers are configured as a piece being a 17-nm single layer, and is thus a magnetically unstable configuration as it is stored with a large amount of magnetic energy outside of the recording layer. With such configurations, in the user data recording area 30, even if once-recorded user data is not updated by overwriting for a design life of the magnetic disk device (generally five years or longer), stable data reading with no error can be expected. On the other hand, in the encryption key data recording area 32, the magnetic pattern shows random reverse immediately after the recording, and with the passage of three months after the recording at room temperature, even if the error correction using ECC data is performed together, the encryption key data has not been able to be normally read and restored. Note that, as a result of evaluation separately made using an evaluation device, the coercive force of the entire recording layer of the user data recording area 20 is 520 kA/m (6500 Oe), and the coercive force of the recording layer of the encryption key data recording area 22 is 120 kA/m (1500 Oe).

In this embodiment, for the aim of relatively increasing the recording data losing speed (the time until the recorded data is not be able to be reproduced correctly any more) in the encryption key data recording area 32, adopted is a method of relatively reducing the coercive force of the entire recoding layer depending on the existence of the antiferromagnetically-coupled layer while equating the recording density and the error correction capability in the respective areas. Alternatively, to achieve any similar object, the following method will also do while equating the recording density and the error correction capability in the respective areas. That is, the possible methods include a method of partially reducing the volume of crystal particles by reducing the thickness of the recording film of the encryption key data recording area 32, a method of causing thermally-induced structural relaxation by locally heating the encryption key data recording area 32 using light beams or others, a method of causing physical configuration relaxation by locally implanting Ar ions into the encryption key data recording area 32, a method of locally adjusting the surface roughness of the surface of the base layer for the recording layer, and others. Moreover, other than these methods of varying the characteristics of a recording medium while equating the recording density and the error correction capability in the respective areas, with a possible method, the user data recording area 30 and the encryption key data recording area 32 share the same characteristics of a recording medium, the same error correction capability, and others, but the encryption key data recording area 32 is set to have the higher recording density than the user data recording area 30, and the influence of magnetic inversion of a crystal particle area due to thermal excitation or others appears more apparently in the encryption key data recording area 32 so that the error rate before the error correction due to deterioration of a reproduction signal is increased with more speed. With another possible method, the user data recording area 30 and the encryption key data recording area 32 share the same characteristics of a recording medium, the same recording density, and others, and the error correction capability in the encryption key data recording area 32 is set lower than that of the user data recording area 30, and the influence of occurrence of a reading error due to inversion of a crystal particle magnetic area by the thermal excitation or others appears more apparently (quickly) in the encryption key data recording area 32.

By referring to the flowcharts of FIGS. 7 and 8, described next is the operation of the magnetic disk device in this embodiment. The operations of FIGS. 7 and 8 are under the control of the processor 104 of FIG. 1.

Figure 7:
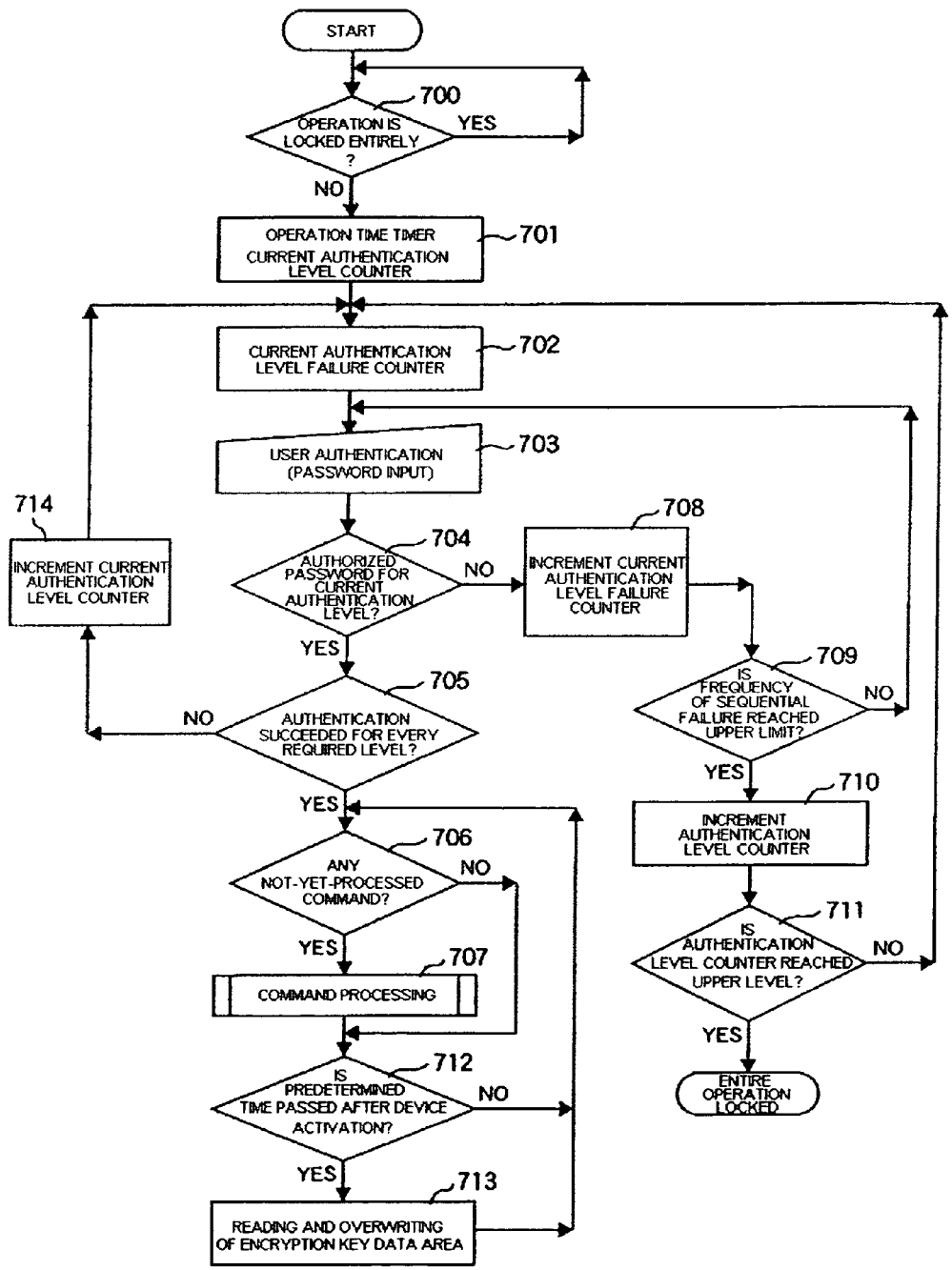
FIG. 7 is a flowchart of the operation of the magnetic disk device in an embodiment of the present invention.
Figure 8:
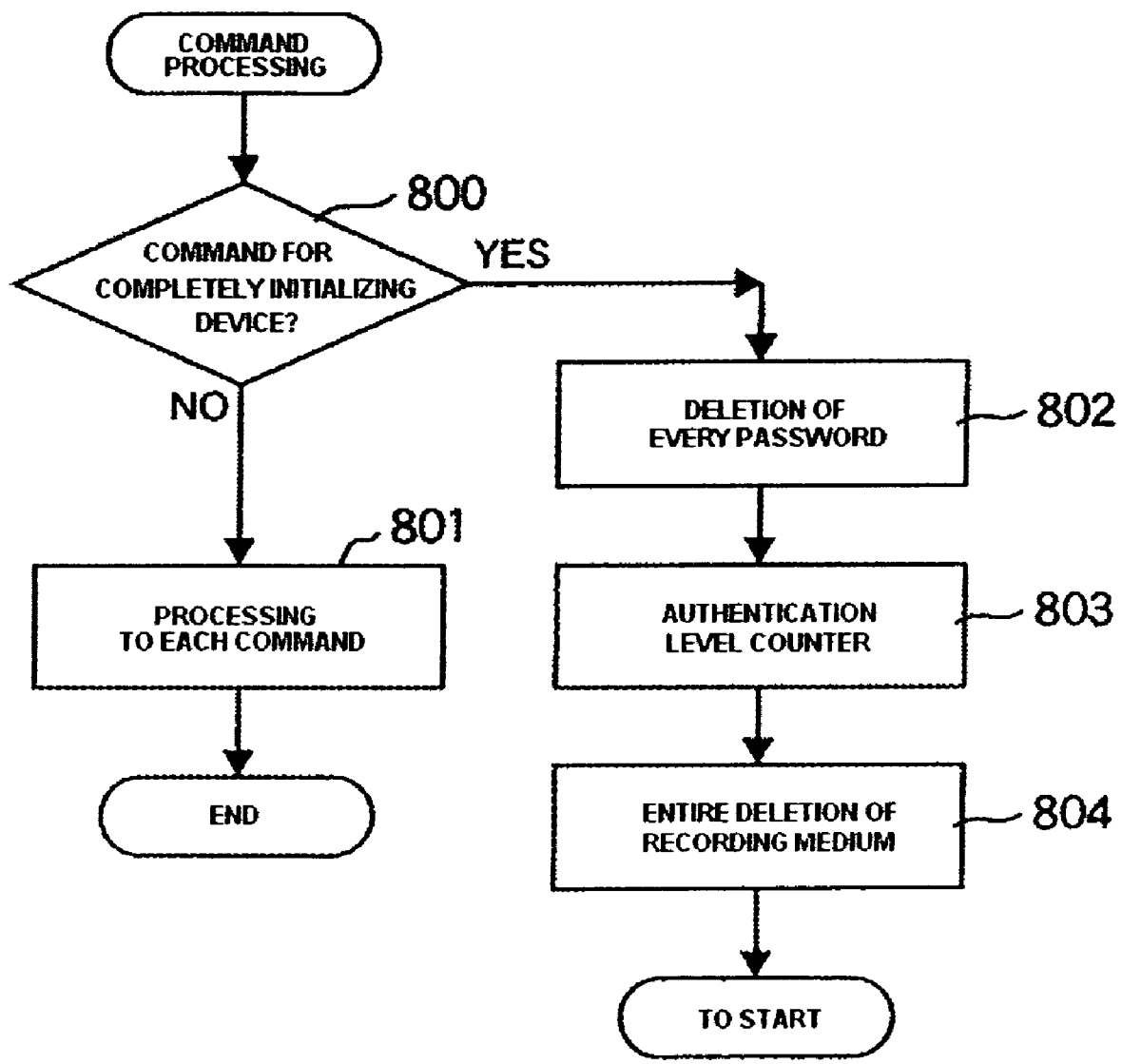
FIG. 8 is a flowchart of command processing in the operation of FIG. 7.

In FIG. 7, when the magnetic disk device 100 is activated again by being turned on or by an external forced reset signal, in step 700, a reference is made to a flag that is stored in the NV-RAM 113 of FIG. 1 with safety, and is indicating the operation lock status of the magnetic disk device. When the operation is entirely locked, the procedure does not move to the operation thereafter, and the lock status of not accepting any command coming from outside is continued. When the operation is not entirely locked, in step 701, the timer 114 of counting the sequential activation time of the magnetic disk device 100 is cleared, and a current authentication level counter indicating the security level of a password being currently in use for user authentication (in steps of password authentication using a plurality of passwords, which of the passwords is used for authentication currently undergoing, i.e., in which steps the password authentication currently undergoing is) is cleared. The procedure then goes to the password authentication mode of the lowest security level.

Then in step 702, as a preparation for accepting the first password authentication attempt at the current security level from the external host device, cleared is a current authentication level failure counter (at the current security level, the frequency of sequential failures of password authentication is counted) indicating the frequency of password authentication attempts. Then in step 703, when password data comes from the external host device for use with user authentication, in step 704, the processor 104 matches it with the password data of the current security level indicated by the current authentication level counter among the password data separately stored in the NV-RAM 113 with safety. As a result of matching as such, when there is no matching between the password data, in step 708, the current authentication level failure counter is incremented, and in step 709, a determination is made whether the frequency of sequential failures of password authentication indicated by the counter has reached a predetermined upper limit. As a result of the determination, when the frequency of sequential failures of password authentication is not yet reaching a predetermined upper limit, the password authentication of the current security level (step 703) is then resumed. On the other hand, as a result of this determination, when the frequency of sequential failures of password authentication has reached the predetermined upper limit, in step 710, the above-described authentication level counter stored in the NV-RAM 113 with safety is incremented, and the number of password data needed eventually for the user authentication, i.e., the number indicating how many more steps to go for password authentication with how many more passwords (the number of steps), is incremented. Then in step 711, when the authentication level counter has reached the predetermined upper limit, a setting is made to the flag that is being stored with safety in the above-described NV-RAM 113 and is indicating the operation lock status of the magnetic disk device 100, and even if any type of command comes from the external host device thereafter, the operation of the magnetic disk device 100 is entirely locked. On the other hand, when the authentication level counter is not yet reaching the predetermined upper limit in step 711, the procedure returns to step 702, and the current authentication level failure counter is cleared. Thereafter, the password authentication (step 703) is resumed with the current security level.

With the configuration and operation, when an accessing person repeatedly fails password authentication, the authentication level is continuously incremented, and the number of passwords needed until the magnetic disk device 100 becomes available for use is increased, and the number of steps for authentication is increased. As a result, even if an unauthorized user keeps making attempts of password authentication, the time to go through all the steps for authentication is automatically extended so that any unauthorized access with respect to user data can be effectively prevented. Note here that the authentication level counter stored with safety in the NV-RAM 113 and the password data for the respective security levels is set, before shipment, to 0 or null-cleared when the magnetic disk device is manufactured. As such, when the magnetic disk device 100 is firstly used, with one-time password authentication of a null password, the magnetic disk device 100 becomes available for use.

Moreover, in step 704, when a matching of password data is observed, then in step 705, a determination is made whether the user authentication is succeeded at every security level requested by the authentication level counter, i.e., whether the value of the current authentication level counter is the same as the value of the authentication level counter. When the user authentication is not yet succeeded at every security level requested by the authentication level counter, in step 714, the current authentication level counter is incremented, and the procedure returns to the clear operation of the current authentication level failure counter in step 702 to perform the password authentication at the security level of the next step.

If it is verified that the user authentication is succeeded at every security level requested by the authentication level counter in step 705, the procedure goes to processing for a recording/reproducing command or others, which is the original function of the magnetic disk device. That is, in step 706, a determination is made whether there is any not-yet-processed command provided by the external host device, and when there is any not—yet-processed command left, the procedure goes to the entity process of the command details of FIG. 7 (step 707). After the entity processing is through for each of the commands, or as a result of the determination in step 706, when there is no not-yet-processed command, in step 712, the time counting result of the timer 114 is referred to for a determination whether any predetermined length of time has passed after the magnetic disk device 100 is activated. The predetermined length of time in this case is a length of time corresponding to a cycle of a time sufficiently shorter than the time of being able to correctly read and restore the encryption key data recorded in the above-described encryption key data recording area 32 (about an hour in this embodiment). When the predetermined length of time has passed in step 711, in step 713, the encryption key data is read from the encryption key data recording area 32, and the same encryption key data is overwritten again to the same area so that the recording is refreshed, and the time until the encryption key data will be gone is extended. After the overwriting operation in step 713, or when the predetermined length of time is not yet passed in step 712, the procedure returns to step 706 again, and the procedure returns to processing of any new command provided by the external host device.

FIG. 8 is a diagram showing exemplary command processing of the magnetic disk device 100 of the embodiment, and is a diagram illustrating the command processing step 707 in the flowchart of FIG. 7 with more details.

When the control application moves to the command processing, in step 800, the processor 104 makes a determination whether a command provided by the external host device is a command of completely initializing the magnetic disk device 100. If it is not a command of completely initializing the magnetic disk device 100, the processor 104 determines the type of the command, and the magnetic disk device 100 moves to the operation of processing any appropriate command (step 801). On the other hand, when the command is of completely initializing the magnetic disk device 100, in step 802, the password data stored in the NV-RAM 113 is entirely null-cleared, and the authentication level counter is zero-cleared (as such, similarly to the case immediately after the shipment of the magnetic disk device 100, at the time of use immediately thereafter, one-time password authentication using a null password puts the magnetic disk device 100 available for use). Then in step 804, the user data recording area 30 and the encryption key data recording area 32 on the magnetic disk are entirely deleted so that the device is put back to the state immediately after the shipment.

As such, as described by way of an embodiment according to the present invention, in an information recording/reproducing device that applies encryption for recording of user data onto a recording medium, when a user having an authorized access right does not access the information recording/reproducing device through an authorized access right check procedure for a predetermined length of time, the encryption key data used to encrypt the user data cannot be read out, whereby the user data itself cannot be used normally. With such characteristics, even if the information recording/reproducing device becomes out of touch of an accessing person having an authorized access right because it is lost or stolen, and even if the device is exposed to threat of unauthorized access, a setting is previously made appropriately to a time before the user data becomes not available by the encryption key data becoming not available for reading so that the user data cannot be accordingly decrypted before the user authentication is broken by a password. Accordingly, any unauthorized access attempted to the user data can be prevented effectively, and the security is expected to be considerably improved with low cost and with no need to prepare any secure time information provision means, an encrypted communications path, and others. Moreover, even if an information recording/reproducing device recorded with any user data is sold, transferred, or discarded, the user data cannot be correctly decrypted after the lapse of a predetermined time of not being able to use encryption key data encrypting the user data, whereby the user data actually becomes not available for reading. This thus requires no more operation of deleting the user data, and this leads to considerable advantages in view of management, operation, and discard cost. Especially even if an electric circuit, recording/reproducing means, scanning means, or others in the information recording/reproducing device are broken down, and even if the deletion operation cannot be executed for the user data, this requires no more operation of deleting the user data or physical or mechanical operation to be ready for any unauthorized access by exchange of any broken-down portion, and this becomes very advantageous in view of management, operation, and discard cost from the use start to the use end of the information recording/reproducing device.

What is claimed is:

1. An information recording/reproducing device, comprising:
    a recording medium provided with a user data recording area and an encryption key data recording area in which a time of not being able to correctly reproduce recorded data in the encryption key data recording area, is shorter than a time of not being able to correctly reproduce recorded data in the user data recording area;
    a write element of performing data recording by causing a local physical state change on the recording medium;
    a read element of performing data reproduction by reading a local physical state distribution on the recording medium; and
    a scanning mechanism for scanning an arbitrary position on the recording medium by the write element or the read element, wherein
    at the time of recording of user data, recording is performed to the user data recording area of the recording medium while encrypting the user data, and encryption key data to be used for encryption is recorded in the encryption key data recording area, and
    at the time of reproduction of the user data by a user having an authorized access right, the encryption key data is read from the encryption key data recording area, the user data encrypted at the time of recording is output while being decrypted by an encryption key once reproduced from the encryption key data recording area, and the encryption key data is overwritten on the encryption key data recording area.

2. The information recording/reproducing device according to claim 1, wherein an error correction capability of an error correction code with respect to the encryption key data in the encryption key data storage area is lower than an error correction capability of an error correction code with respect to the user data in the user data recording area.

3. The information recording/reproducing device according to claim 1,
    wherein a recording density of the encryption key data recording area is higher matched with that of the user data recording area.

4. The information recording/reproducing device according to claim 1, further comprising
    a memory for storing at least two or more authentication data for use as authentication data for verifying the authorized access right, wherein
    for verifying the access right, a matching is made between authentication data provided by the user and the authentication data stored in the memory,
    for counting a frequency in sequential failure of the matching
    every time the frequency in sequential failure of the matching reaches a predetermined value, within a range of the number of the authentication data that can be stored in the memory, the number of the authentication data to be referred to for the matching of the authentication data is increased.

5. The information recording/reproducing device according to claim 1, wherein the recording medium further comprises:
    a substrate; and
    a recording layer that is formed at least on one surface of the substrate, and performs data recording by retaining a local physical state change, wherein
    the recording layer is provided with the user data recording area and the encryption key data recording area.

6. The information recording/reproducing device according to claim 5, wherein the recording layer comprises a magnetic recording layer, and a coercive force of the encryption key data recording area is smaller matched with that of the user data recording area.

7. The information recording/reproducing device according to claim 5, wherein the recording layer comprises a magnetic recording layer, and a magnetic anisotropy of the encryption key data storage area is smaller matched with that of the user data recording area.

8. The information recording/reproducing device according to claim 5, wherein the recording layer comprises a magnetic recording layer, and a volume of a magnetic crystal particle of the encryption key data storage area is smaller matched with that of the user data recording area.

9. The information recording/reproducing device according to claim 5, wherein the encryption key data recording area is provided to an area of the user data recording area, and is subjected to structural relaxation by heating or ion implantation.

10. The information recording/reproducing device according to claim 5, wherein the encryption key data recording area is provided to an area of the user data recording area, and a surface roughness of an underlayer of the encryption key data recording area is higher than a surface roughness of an underlayer of the user data recording area.

11. An information recording medium, comprising:
    a substrate; and
    a recording layer that is formed at least on one surface of the substrate, and performs data recording by retaining a local physical state change, wherein
    the recording layer is provided with a user data recording area and an encryption key data recording area, and a time of not being able to reproduce recorded data in the encryption key data recording area is shorter than a time of not being able to reproduce recorded data in the user data recording area.

12. The information recording medium according to claim 11, wherein the recording layer comprises a magnetic recording layer, and a coercive force of the encryption key data recording area is smaller matched with that of the user data recording area.

13. The information recording medium according to claim 1 wherein the recording layer comprises a magnetic recording layer, and a magnetic anisotropy of the encryption key data storage area is smaller matched with that of the user data recording area.

14. The information recording medium according to claim 1 wherein the recording layer is composed of magnetic recording layer, and a volume of a magnetic crystal particle of the encryption key data storage area is smaller matched with that of the user data recording area.

15. The information recording medium according to claim 11, wherein an error correction capability of an error correction code with respect to the encryption key data in the encryption key data recording area is lower than an error correction capability of an error correction code with respect to the user data in the user data recording area.

16. The information recording medium according to claim 1 wherein a recording density of the encryption key data storage area is higher matched with that of the user data recording area.

17. The information recording medium according to claim 11, wherein the encryption key data recording area is provided to an area of the user data recording area, and is subjected to structural relaxation by heating.

18. The information recording medium according to claim 11, wherein the encryption key data recording area is provided to an area of the user data recording area, and is subjected to physical structural relaxation by ion implantation.

19. The information recording medium according to claim 11, wherein the encryption key data recording area is provided to an area of the user data recording area, and a surface roughness of an underlayer of the encryption key data recording area is higher than a surface roughness of an underlayer of the user data recording area.

20. The information recording medium according to claim 11, wherein a recording data losing time in the user data recording area of the recording layer is shorter than a recording data losing time in the encryption key data recording area.

* * * * *

UNITED STATES PATENT AND TRADEMARK OFFICE
CERTIFICATE OF CORRECTION

| | | |
|---|---|---|
| PATENT NO. | : 8,073,142 B2 | Page 1 of 1 |
| APPLICATION NO. | : 12/006698 | |
| DATED | : December 6, 2011 | |
| INVENTOR(S) | : Hideki Saga and Tatsuya Hirai | |

It is certified that error appears in the above-identified patent and that said Letters Patent is hereby corrected as shown below:

In column 15, line 7, "1" should be replaced with --11--.
In column 15, line 12, "1" should be replaced with --11--.
In column 16, line 2, "1" should be replaced with --11--.

Signed and Sealed this
Seventeenth Day of April, 2012

David J. Kappos
*Director of the United States Patent and Trademark Office*